United States Patent
Sloot

(10) Patent No.: US 6,743,322 B2
(45) Date of Patent: Jun. 1, 2004

(54) PROCESS FOR MANUFACTURING THERMOPLASTIC-TRIMMED ARTICLE OF CLOTHING

(75) Inventor: Alexander Sloot, Sugarloaf, PA (US)

(73) Assignee: Printmark Industries Inc., Hazleton, PA (US)

( * ) Notice: Subject to any disclaimer, the term of this patent is extended or adjusted under 35 U.S.C. 154(b) by 163 days.

(21) Appl. No.: 09/768,450

(22) Filed: Jan. 24, 2001

(65) Prior Publication Data

US 2002/0098312 A1 Jul. 25, 2002

(51) Int. Cl.[7] .......................... D03D 47/50; D06C 25/00
(52) U.S. Cl. .................. 156/251; 156/88; 156/267; 156/308.4
(58) Field of Search .................. 156/88, 73.1, 73.3, 156/73.4, 251, 267, 515, 308.4, 530, 580.1, 583.1

(56) References Cited

U.S. PATENT DOCUMENTS

| | | | | |
|---|---|---|---|---|
| 3,758,358 A | * | 9/1973 | Kuroda | 156/222 |
| 3,901,579 A | * | 8/1975 | Demerest | 2/326 |
| 4,268,338 A | * | 5/1981 | Peterson | 206/805 |
| 4,364,785 A | * | 12/1982 | Wajs et al. | 156/88 |
| 4,886,697 A | * | 12/1989 | Perdelwitz et al. | 297/219.1 |
| 5,028,294 A | * | 7/1991 | England | 156/251 |
| 5,061,331 A | * | 10/1991 | Gute | 156/251 |
| 6,024,455 A | * | 2/2000 | O'Neill et al. | 283/85 |
| 6,248,202 B1 | * | 6/2001 | Corzani et al. | 156/251 |
| 2002/0079039 A1 | * | 6/2002 | Azulay | 156/73.1 |

* cited by examiner

*Primary Examiner*—Richard Crispino
*Assistant Examiner*—Cheryl N. Hawkins
(74) *Attorney, Agent, or Firm*—St. Onge Steward Johnston & Reens

(57) ABSTRACT

An article of clothing has a trim of thermoplastic material, which encapsulates a peripheral region of a fabric layer and is provided with a multiplayer structure preferably including at least one retroreflective layer. The article of clothing is manufactured in accordance with a sealing method utilizing RF, sonic sealing, heat sealing, and vibration sealing performed simultaneously with cutting excess of the thermoplastic material.

4 Claims, 5 Drawing Sheets

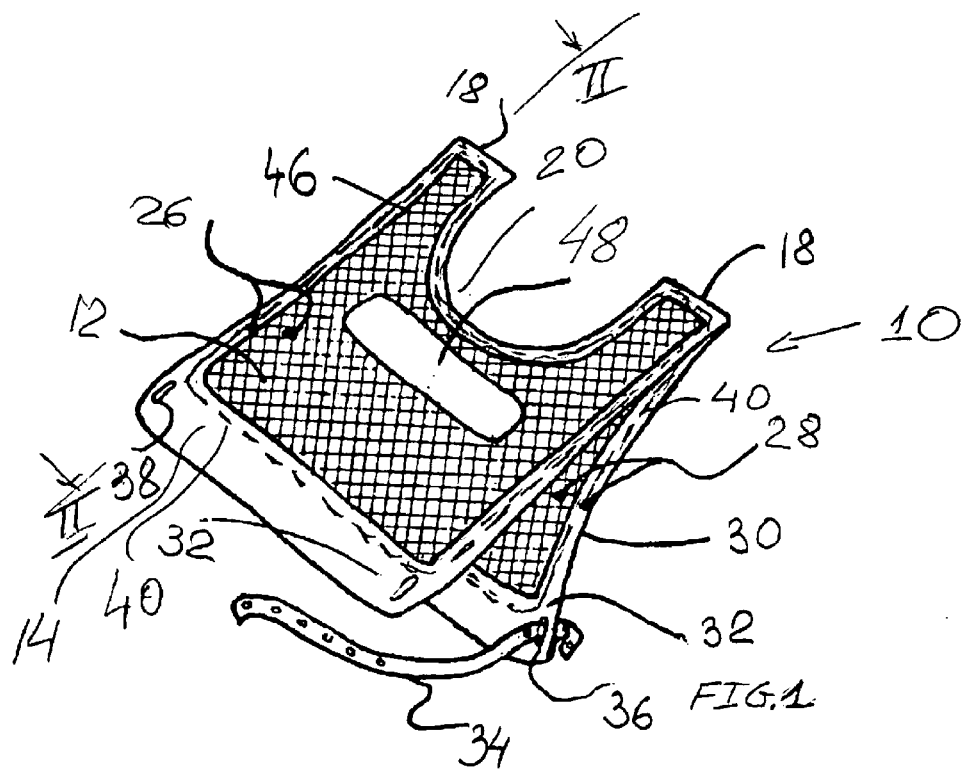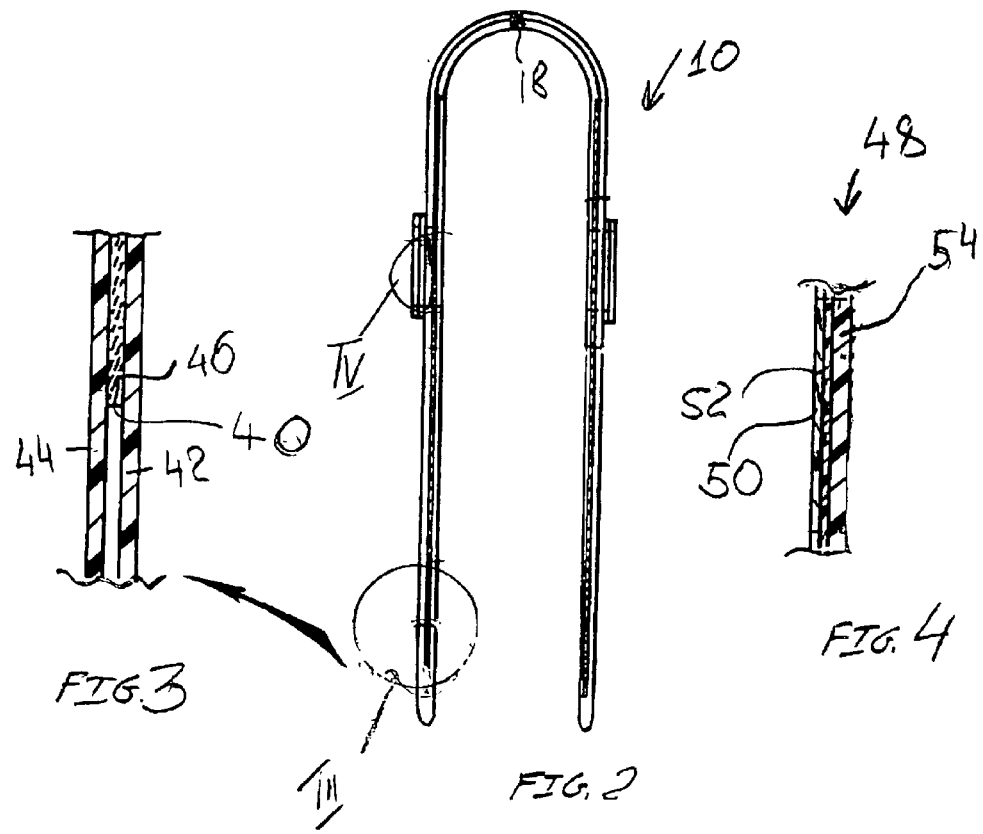

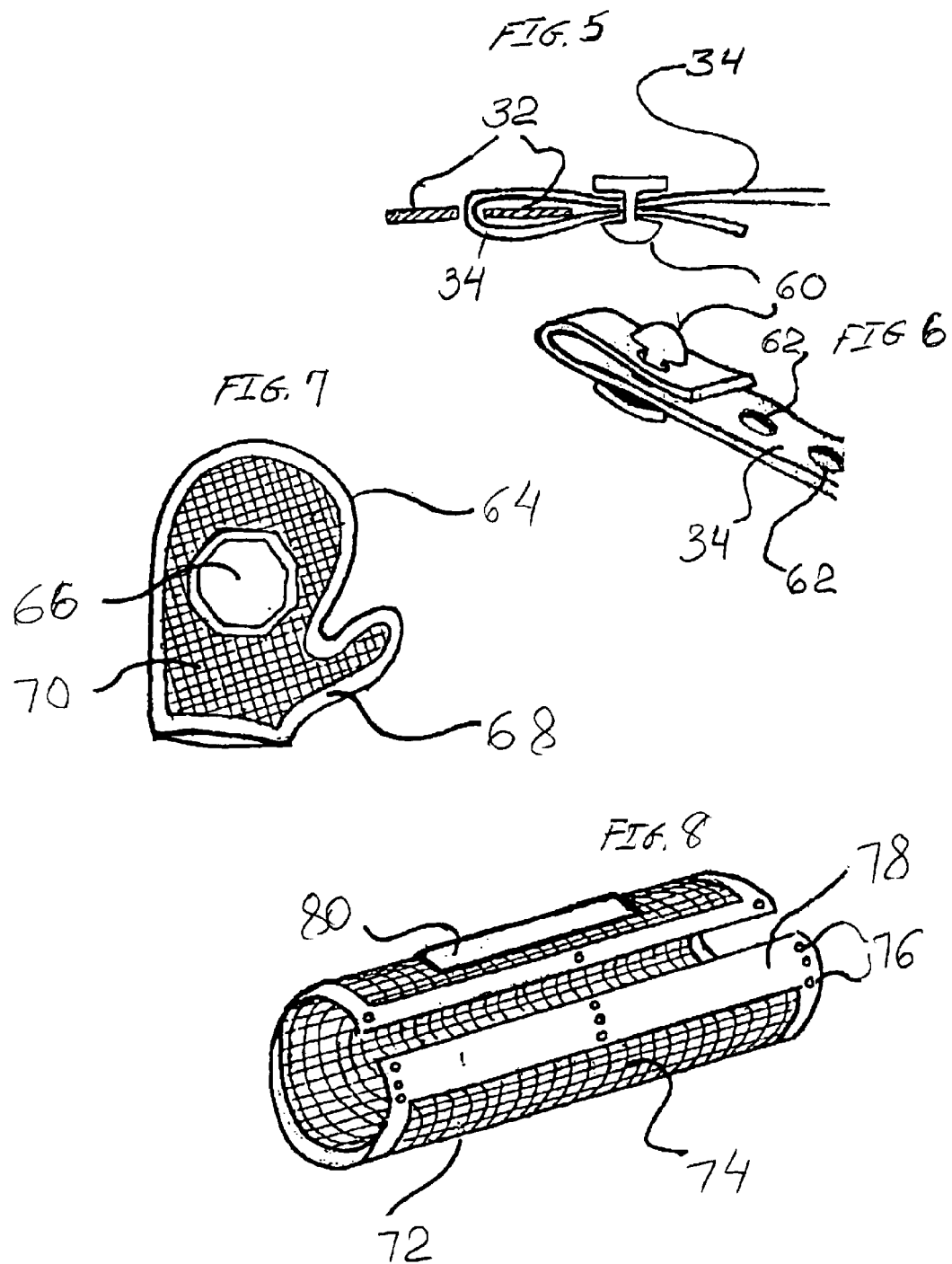

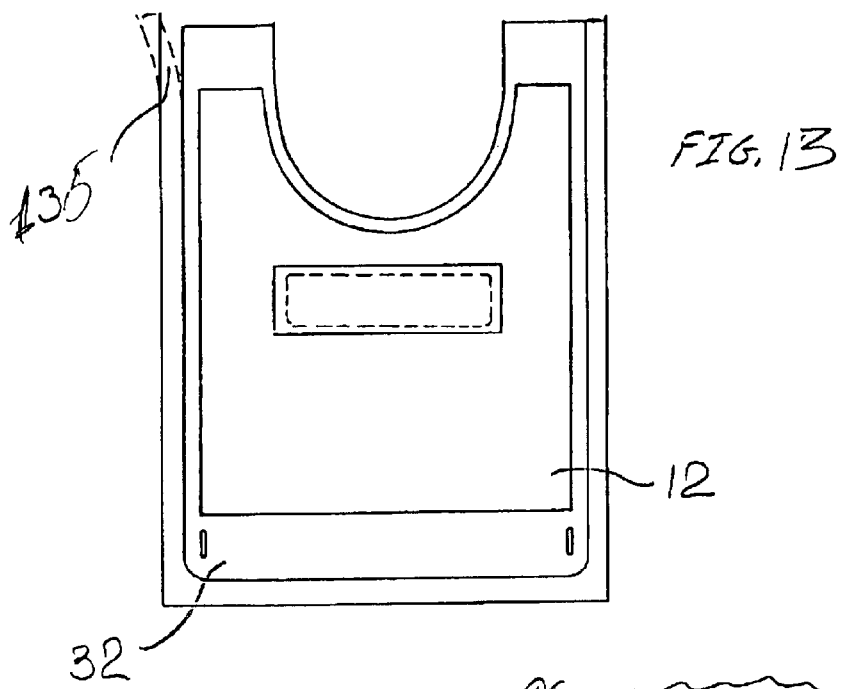
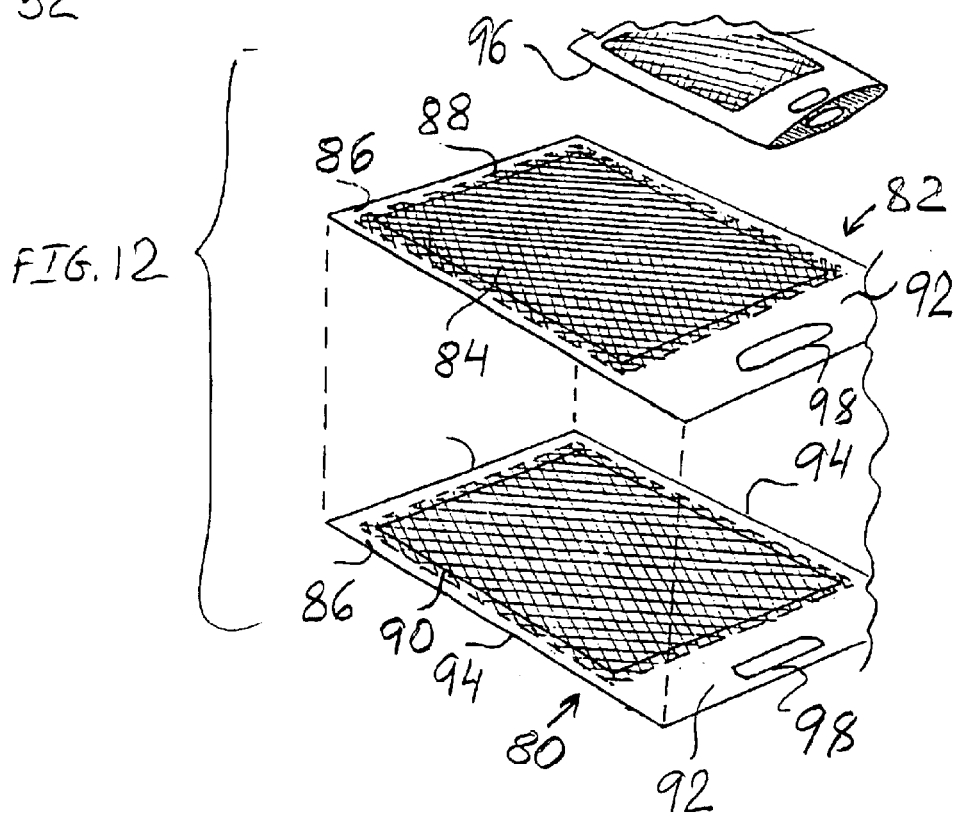

PROCESS FOR MANUFACTURING THERMOPLASTIC-TRIMMED ARTICLE OF CLOTHING

FIELD OF THE INVENTION

The invention relates to a cloth product, and more particularly to a wearable item such as mesh vest, glove, bib and the like that is created by joining the cloth parts together by sealing. Not only may these parts be joined together, but the edges are sealed with this process, eliminating the need for sewing, hemming and binding materials.

BACKGROUND OF THE INVENTION

Known in the art are wearable articles such as safety mesh vests used by runners and highway workers. Other mesh of fabric-type items are those such as mitts, bibs, tank-tops and t-shirts.

Some of these types of articles such as the vests are not only sewn together during the course of their assembly, but they might have trim such as a type of binding, sewn along their perimeter or internally as part of joining the various cut parts together. This trim may be the same or of a contrasting color to the mesh or fabric material used for the body of the wearable.

The basic method for assembling garments of the type described above is by means of sewing the parts cut from pre-designed patterns together. The garments can then be decorated, which typically involves screen printing on the surface of the garments. Other decorative processes including heat transfer application, attaching embroideries directly or indirectly, and other commonly used methods of embellishment may also be employed.

Typically, these methods of decoration require that the decoration be applied to the surface of the garment either before the cut parts have been sewn together, or after these parts have been attached to one another.

What is desired therefore is a quick, simple, easy to assemble an article of clothing and at the same time eliminate the need for sewing to join and/or hem the edges of the garment of the cut parts. In addition what is also desired is a way to decorate these parts while they are being assembled with an applique which can be applied while the item is being trimmed and put together.

SUMMARY OF THE INVENTION

This is achieved by the inventive method having the pre-cut fabric parts set up in a sealing machine such as an R.F. sealing machine, where a thermoplastic material such as vinyl or urethane can be bonded to at least one side of each fabric part in solid areas or in thin trim-like areas depending on what is desired. Accordingly, a peripheral or trim area of the fabric part is enclosed is covered by a layer of the thermoplastic material. As the layers of fabric and thermoplastic material are bonded together, a trim area preventing the edge of fabric from fraying is formed. Preferably, cutting and bonding operations are performed simultaneously.

In one embodiment in accordance with the invention, a first layer of vinyl could bear a decorative printing on one side. This will overlay a second vinyl layer which may be plain or of a different color. In another embodiment the top vinyl layer may be reflective, or glow in the dark, or holographic or have some other background of an interesting nature. This too can be placed on a plain or colored recipient vinyl. Since these vinyl materials will generally form the edging of the article of clothing, so the color of special properties of the vinyl will only be apparent along the edge.

However in another embodiment the article can be made exactly as described above, but an area in the center of the garment can be appliqued at the same time. In this instance the special effects of the vinyl will be apparent as trim around the edges and also in other areas on the article.

In another embodiment the cut fabric parts can be sealed in-between two pieces of vinyl as the edge seams are formed, and in yet another embodiment, vinyl on one side need only be used.

With a sealing method in accordance with the invention, a great variety of perimeter shapes for the edges of the clothing articles can be achieved and made available with attractive appearances and/or reflective features as seems desirable.

The preferred articles made with this method and technique would include activewear mesh vests, fabric/mesh mitts, babies bibs, sleeve gauntlets, tank tops, t-shirts, shorts and the like. These and other wearable or accessory items can be provided with decorations on them. Decorations, which may include features such as a reflective vinyl strip for user safety, can be applied while the products are being edge-finished.

Accordingly, it is an object of the invention to provide a method whereby an article of clothing can be assembled without need for sewing.

Still another object of the invention is to provide a method of assembling an article of clothing having fewer steps than the above discussed prior art methods.

Still another object of the invention to provide a method of assembling an article of clothing wherein trim is added to the edges of cut parts without having to stitch a fabric binding or other material to these cut part.

Yet a further object of the invention is to provide a method of assembling an article of clothing wherein reflective or other safety or other functional trim is added to the cut part while the garment is being edged and/or assembled.

Still another object of the invention is to provide an article of clothing having vinyl trim sealed to the edges of cut parts without the need to fold fabric over at the edge of cut parts.

Yet another object of the invention is to provide an article of clothing having its center areas appliqued.

A further object of the invention is to provide a sealing machine having sealing dies which are shaped and sized to seal the fabric with at least one layer of thermoplastic material to manufacture a garment having a variety of shapes of its decorative perimeter.

BRIEF DESCRIPTION OF THE DRAWINGS

The above and other features, objects and advantages will become more readily apparent from the following description accompanied with the drawings, in which:

FIG. 1 is a perspective view of a garment manufactured in accordance with the invention.

FIG. 2 is a sectional view taken along lines II—II of FIG. 1.

FIG. 3 is a sectional view of detail III of FIG. 2.

FIG. 4 is a sectional view of detail IV of FIG. 2.

FIG. 5 is a partially sectional view of a strap 34 shown in FIG. 1.

FIG. 6 is a perspective view of the strap.

FIG. 7 is a bottom view of a garment manufactured in accordance with the invention and having trim and inner decorative areas formed on the mesh fabric.

FIG. 8 is a perspective view of another garment manufactured by a method in accordance with the invention.

FIG. 12 is an elevation perspective view of a tote bag made in accordance with the invention.

FIG. 13 illustrates a step of stripping scrap from the garment shown in FIG. 1 and manufactured in accordance with the invention.

DETAILED DESCRIPTION OF THE DRAWINGS

Figure 9:
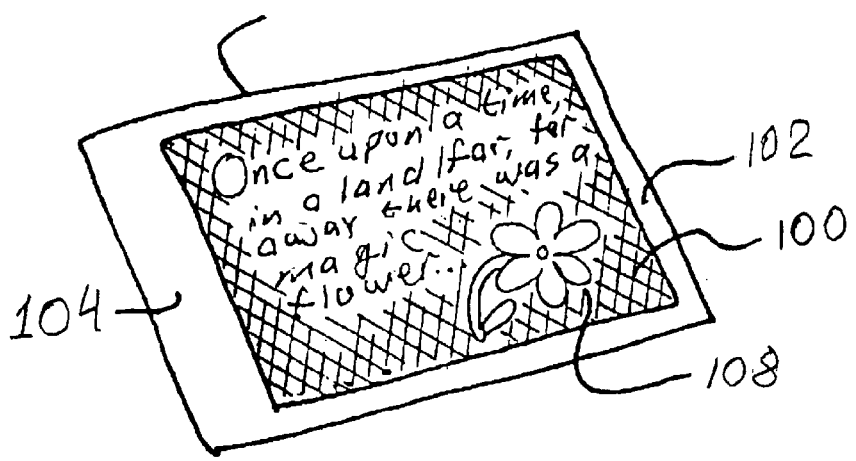
FIGS. 9–11 are perspective views of book pages manufactured in accordance with the invention.

Referring to FIGS. 1–4 an article of clothing, such as a vest 10 manufactured in accordance with the invention, includes front and back sides 26, 28 attached to one another along top seam 18 which defines an opening 20 sized to allow the vest to be comfortably worn by a wearer.

According to one aspect of the invention, each of the front and back sides includes a pre cut layer of the mesh fabric 12 trimmed by a thermoplastic material 14 in accordance with an inventive method, which will be explained herein below. The thermoplastic material is preferably selected from the group including vinyl and urethane and is characterized by its ability to form a bond with another material during an RF sealing step. It is understood that other methods utilizing this ability can be easily used within the scope of this invention.

Each of the front and back vest panels 26, 28 has a peripheral area 32 of the thermoplastic material extending around the perimeter of and bonded to the pre cut mesh fabric 12. The area 32, as shown in FIG. 1, is formed upon bonding of top and bottom thermoplastic material layers 44, 42 (FIG. 3) receiving an end portion 46 of the mesh fabric therebetween. Accordingly, the fabric has an edge 40 totally enclosed between the thermoplastic layers. After the peripheral area is thus manufactured, the vest panels 26, 28 are joined together along the seams 18 during a separate joining step of the inventive process.

To increase the visibility of a wearer of the vest 10, the outer layer 44 can be made of glowing or retro-reflective material. Furthermore, a transparent or colored layer shielding the retro-reflective layer from deterioration can additionally cover the retro-reflective layer 44. Having thus manufactured the vest, not only the safety of a wearer is enhanced, but also the vest becomes esthetically appealing, since the outer layer 44 can be screen-printed with an ornament or message.

Alternatively, the back-up layer 42 can be made of the retro-reflective material, whereas the front layer 44 is made from a transparent or colored material. Regardless of the composition of the trim area, the edge 40 of fabric 46 is enclosed between layers 44 and 42 and thus prevented from fraying or running.

An inner area of either one or both of the panels 26, 28 may have an appliqué 48 bonded to the mesh fabric of the vest 10 simultaneously when the vinyl is sealed to the mesh layer 12. A structure of the appliqué 48, as better seen in FIG. 4, can be made of one or more vinyl layers such as an outer transparent layer 50 and an inner base layer 54 which encapsulate an intermediate layer 52 made of glow, retro-reflective, holographic or other material as the appliqué being formed on the outer side of the panel 26. Alternatively, a two-layer structure of the appliqué including base and retro-reflective layers is contemplated as well. Instead of the applique 48, any decorative element having differently shaped contours may be made of the thermoplastic material and bonded to the garment in accordance with the invention.

Each of the front and back panels 26, 28 are manufactured with slots 36, 38. Adjustable straps 34 are threaded through these slots by the wearer to hold the vest close to the body. FIGS. 5 and 6 show each of the straps 34 with holes 62 for receiving studs 60 allowing straps to be adjustable to the desired length.

Referring to FIGS. 7 and 8, other articles of clothing such as a mitt 64 and a sleeve gauntlet 72 are manufactured similarly to the vest 10 described in references to FIGS. 1–6. Particularly, the mitt has a peripheral vinyl area 68 as disclosed above, a graphic or reflective area 66, which may be formed in the central area or back of hand area, and a mesh fabric 70 bonded to the rest of this structure. The gauntlet 72 has a trim vinyl layers 76 encapsulating a peripheral edge of a mesh fabric 72 and having slots 76 which receive fastening studs. A decorative area 80 having a structure similar to the reflective area 66 of the mitt 64 is attached to the mesh fabric 74.

Figure 10:
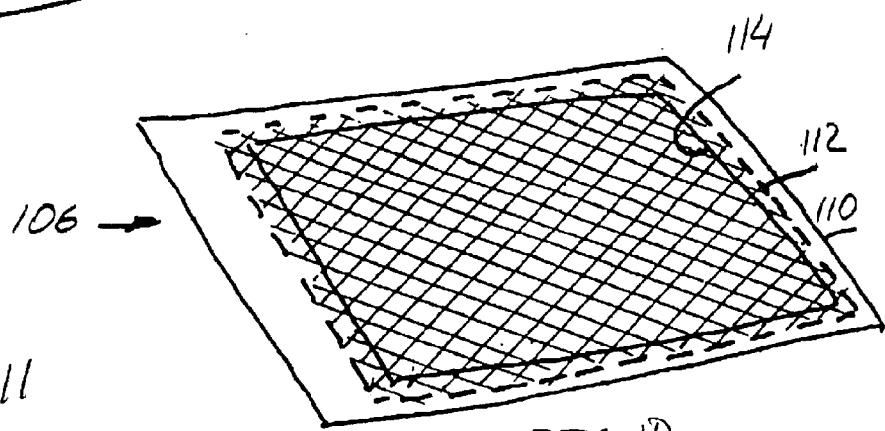
Figure 11:
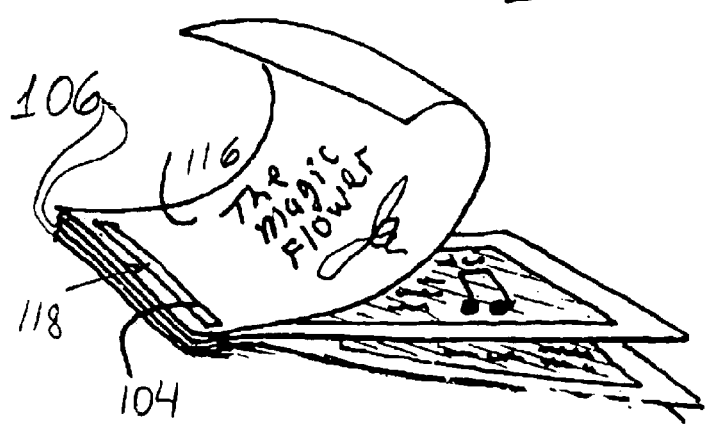

Other items made in accordance with the invention can include, for example, cloth books, as shown in FIGS. 9–11. Here the page fabric 100 including canvas, linen or other cloth will be sealed with vinyl trim 102 around its perimeter and the inside is stripped away. Then a series of pages 106 (FIG. 14) can be "bound" together by sealing one edge 104 of the vinyl simultaneously where a number of pages are stacked together. A decorative area 108 can be made from the same material as the vinyl trim 102, or from another material and sealed to the fabric 100 while the trim is being formed.

FIG. 10 illustrates one of the pages 106 manufactured in accordance with the inventive method. Particularly, it shows where fabric will end within the vinyl trim area 110, and how the fabric is trapped between two layers of vinyl. In this embodiment, the fabric is sealed between inner 114 and outer 112 edges of the vinyl sheet.

FIG. 11 shows an assembled cloth book where an element 116 represents the cover. This cover can be made from the vinyl/cloth combination, or it can be made from vinyl only. Stacking pages 106 upon one another so as to have their wide edges 104 sealed together form the spine area 118. This is a unique method of binding a book.

FIG. 12 shows a tote bag being made in accordance with the invention and having back and top panels 80, 82, respectively, each having a combination of mesh 84 and edge 86 regions. The panels are bonded together along a respective perimeter 88 shown in dash lines. The mesh fabric 84 is pre-cut to be of a size that will end within the vinyl trim. As will be explained below, a sealing die is shaped to cut away a vinyl sheet 92 along a solid line 90 by its cutting edge while a sealing outer edge bond the mesh and the rest of the sheet 92. The center part of the vinyl sheet cut during manufacturing of each of the panels is stripped away after the mesh fabric has been trapped and sealed between two layers of vinyl. The panels are sealed together along an outer line 94 and, as shown at 96, the finished tote bag is completed after excess vinyl has been stripped away. Handles 98 are formed during manufacturing of the individual panel.

It should be understood that the preferred material from which to make the trim and decorative areas is flexible vinyl also known as PVC. Fabric materials may be of almost any type of cloth or fabric. For vests one may wish to use a nylon or polyester mesh material, for a tank top or t-shirt one may use a cotton material. Various garments accessories or wearables include tote bags, pillows, pillow covers, shorts and other such products. Note, any of these garment accessories may be manufactured with a limitless variety of patterns including decorative areas as per the configuration of the sealing dies in accordance with the invention, as described below.

Figure 14:
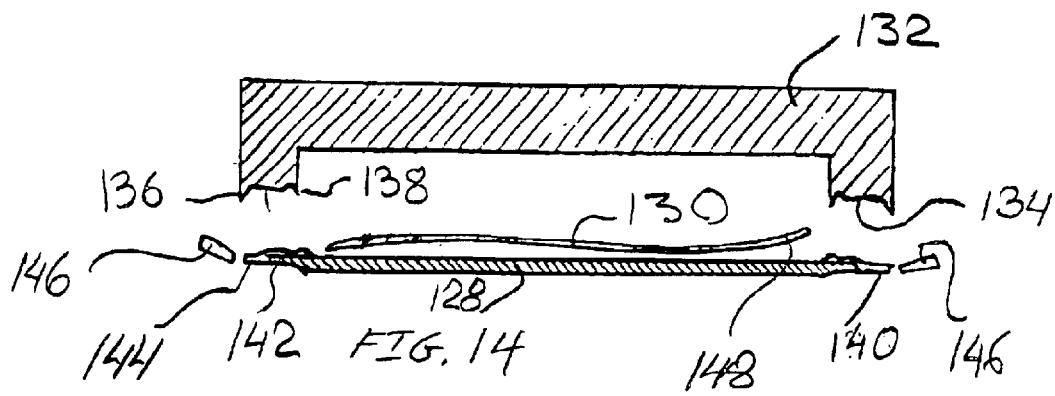
FIGS. 14–17 are cross-sectional views of different types of sealing dies in accordance with another aspect of the invention.

FIG. 14 illustrates one type of sealing die 132 which, according to the invention, is utilized for manufacturing articles having a thermoplastic material placed on one side of the fabric layer. Specifically, a mesh layer 128 has only one layer 130 of vinyl on its top. The die 132 is configured to have an elongated flat ledge 134 extending between cutting edges 136 and 138. During welding, the ledge 134 seals the vinyl trim 140 to an outer peripheral edge 142 of the fabric layer, which terminates inside of the vinyl trim defined along its outer edge 144. Simultaneously with sealing, the cutting edges 136 and 138 of the die sever outside scrap material 146 and inner scrap material 130, which are easily removable from the manufactured vest panel as shown at 135 in FIG. 13.

Figure 15:
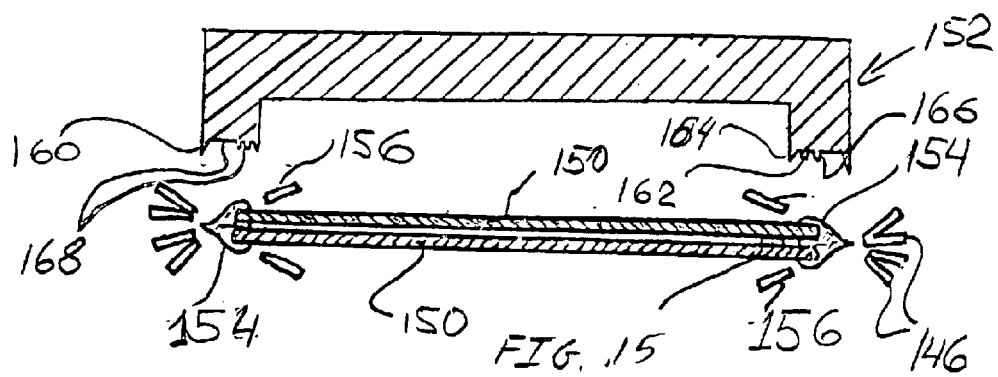

As shown in FIG. 15, a sealing die 152 is used for sealing two pieces of mesh 150. In contrast to the sealing of vinyl in the form of large sheets, this embodiment utilizes two strips of vinyl 154 along the edges.

To seal and cut in accordance with this embodiment, the die 152 has an outer cutting edge removing the outer scrap 146 and a series of inner sealing edges 162 and 166 forming different embossing lines and non-sealing flat ledges 168 to emboss and strengthen the seal points. Note that the outer and inner cutting edges 160, 164 of the die 152 is higher and sharper than the rest of edges to immediately sever the outer and inner scrap 146,156 from the article.

Figure 16:
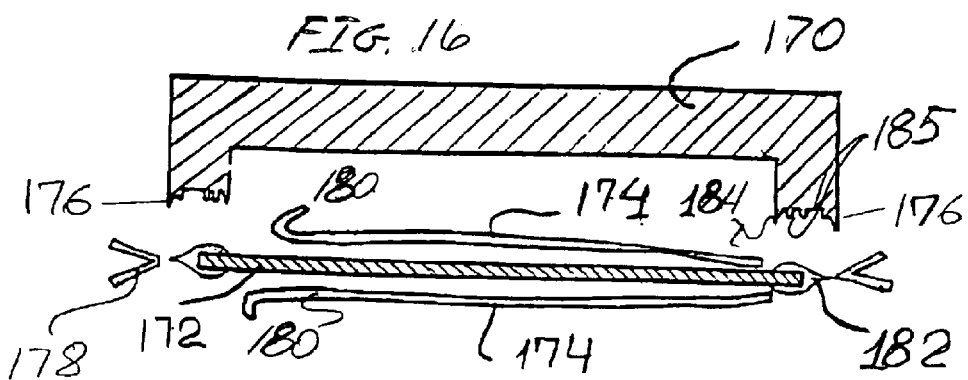

FIG. 16 shows a die 170 being applied to mesh 172 which has vinyl layers 174 sealed to either side leaving intact trim edge 182. Vinyl layers 174 may comprise two separate pieces of material or may comprise a single piece of material folded back on itself. As the die seals the vinyl layer to the mesh, cutting edges 176, 184 on the exterior and interior, respectively, of die 170 cause excess vinyl to be cutaway. As a result of cutting, a strip of scrap 178 occurs on the outside, and a sheet of extra vinyl 180 occurs on the inside. A row of spaced apart sealing lines 185 represent internal embossings within the same general area of the sealing die.

Figure 17:
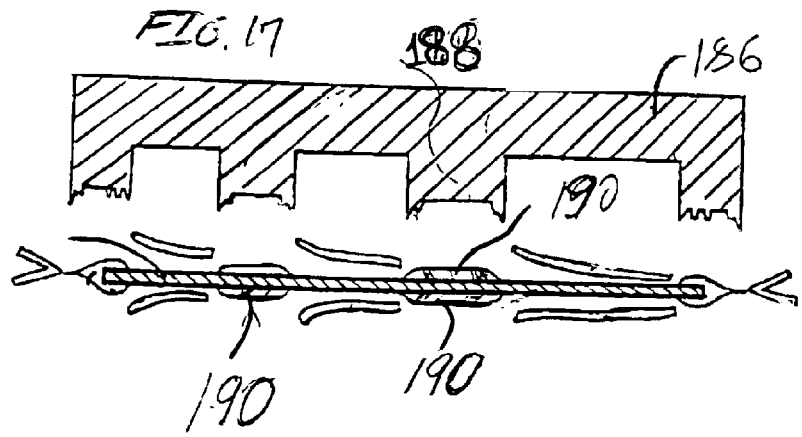

FIG. 17 shows a more complex die 186 than above. This die has inner cutting and sealing areas to selectively treat the vinyl layer. Inner sealing/cutting regions 188 of the die can be used for forming areas 190, which may contain printed graphics or it may be in a design or specific shape to add a decorative feature to the vest panel. These areas 190 can also be a reflective material.

Note, RF sealing is the preferred method of sealing, however other methods such as sonic sealing, heat sealing, vibration sealing and the like can also be used to accomplish the end product. Although the invention has been described with reference to a particular arrangement of parts, features and the like, these are not intended to exhaust all possible arrangements or features, and indeed many other modifications and variations will be ascertainable to those skilled in the art.

What is claimed is:

1. A process of manufacturing an article of clothing comprising the steps of:

providing a die with at least one sealing area having at least one flat sealing ledge and at least one cutting edge which extends over the flat sealing ledge;

interposing a fabric layer with a thermoplastic layer such that a peripheral edge of the fabric layer extends within the thermoplastic layer;

forming an outer edge of the thermoplastic layer extending laterally outwardly from the peripheral edge of the fabric layer by applying the die to the thermoplastic layer to cut excess thereof with the one cutting edge;

simultaneously with cutting sealing overlapped areas of the fabric and thermoplastic layers to each other to form a trimmed article of clothing.

2. The process defined in claim 1 further comprising forming pair of adjustable straps.

3. The process defined in claim 1 further comprising the step of providing the die with another sealing area having a cutting edge and a flat sealing ledge to form a decorative area spaced inwardly from the trim and including at least one covering layer of a transparent material, and a backup layer which is selected from the group consisting of retroreflective and glow material.

4. The process defined in claim 3 wherein forming the decorative area is performed simultaneously with sealing the thermoplastic and backup layers to each other.

* * * * *